(12) United States Patent
Widenhoefer et al.

(10) Patent No.: US 7,549,282 B2
(45) Date of Patent: Jun. 23, 2009

(54) MULTI-SLOT INTER-TURBINE DUCT ASSEMBLY FOR USE IN A TURBINE ENGINE

(75) Inventors: James Fredric Widenhoefer, Glenville, NY (US); Paolo Graziosi, Rome (IT); Kevin Richard Kirtley, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 603 days.

(21) Appl. No.: 11/258,547

(22) Filed: Oct. 25, 2005

(65) Prior Publication Data

US 2007/0089422 A1   Apr. 26, 2007

(51) Int. Cl.
F02C 7/00 (2006.01)
(52) U.S. Cl. .................. 60/39.17; 415/117; 415/914
(58) Field of Classification Search ............... 60/39.17, 60/791; 415/58.1, 58.7, 59.1, 116, 117, 914
See application file for complete search history.

(56) References Cited

U.S. PATENT DOCUMENTS 3,641,766 A * 2/1972 Uehling ...................... 60/262
4,448,019 A * 5/1984 Klees ........................... 60/204
5,357,744 A 10/1994 Czachor et al. ............. 60/39.32
6,851,264 B2 2/2005 Kirtley et al. ................. 60/772
7,137,245 B2 * 11/2006 Graziosi et al. ............... 60/262
2006/0069533 A1 3/2006 Florea et al.

OTHER PUBLICATIONS

R. Florea et al., "Flow-Control-Enabled Aggressive Turbine Transition Ducts and Engine System Analysis," Journal of Propulsion and Power, vol. 23, No. 4, Jul.-Aug. 2007.
R. Florea et al., "Optimization of Bleed-Flow-Control for an Aggressive Serpentine Duct," 43rd AIAA Aerospace Sciences Meeting and Exhibit, Jan. 10-13, 2005, Reno, Nevada.

* cited by examiner

Primary Examiner—Louis J Casaregola
(74) Attorney, Agent, or Firm—Penny A. Clarke

(57) ABSTRACT

A bypass channel for use in an inter-turbine transition duct assembly of a turbine engine is connected to a suction port disposed upstream of a high-pressure turbine and at least two injection openings disposed downstream of the high-pressure turbine. The flow through the bypass channel is motivated by the natural pressure difference across the high-pressure turbine. The flow out of the at least two injection openings is used to energize the boundary layer flow downstream of the high-pressure turbine in order to allow for the use of a more aggressively expanded inter-turbine duct without boundary layer separation. Methods for optimizing the flow through the turbine engine are also disclosed.

14 Claims, 4 Drawing Sheets

MULTI-SLOT INTER-TURBINE DUCT ASSEMBLY FOR USE IN A TURBINE ENGINE

BACKGROUND

The present disclosure relates to turbine engines, and more particularly, to flow control and inter-turbine duct assemblies for use in turbine engines. In gas turbine engines, there is a preferred ratio between the diameters of the high-pressure turbine spool and the low-pressure turbine spool. Specifically, the low-pressure turbine spool has a larger diameter than the high-pressure turbine spool to provide optimal engine performance. Because of this difference in radial size, the transition duct joining the high-pressure and low-pressure turbines must accommodate this change in radius.

However, increasing the size of the duct over a relatively short distance can result in boundary layer separation of the flow within the duct, adversely affecting low-pressure turbine performance. Therefore, gas turbine engines are often designed with elongated transition ducts, or transition ducts that do not achieve the optimal ratio between the high-pressure turbine size and the low-pressure turbine size.

Fluidic flow control from a single slot, typically located at the inlet of a diffusing transition duct, has been used to deliver high momentum fluid to prevent boundary layer flows from separating along the walls of an aggressive, high area-ratio inter turbine duct. The total momentum of injection flow must be sufficient to keep the boundary layers attached along the entire length of the duct. However, large total momentum induces a penalty on the engine cycle because it is typically bled from other sections of the engine (e.g. compressor) and reduces their performance. It is useful then to minimize the total momentum of injected flow required to prevent separation in an aggressive high-area-ratio transition duct.

Therefore, there is a need for continued improvement in the design of such inter-turbine transition ducts that minimize the total momentum of injected flow.

BRIEF SUMMARY

Disclosed herein are inter-turbine duct assemblies for use with turbine engines and methods for optimizing flow within the turbine engine. In one embodiment, an inter-turbine duct assembly comprises a duct having an upstream portion fluidly coupled to a high pressure turbine and a downstream portion fluidly coupled to a low pressure turbine, wherein the duct comprises an inner body surface and an outer body surface, and wherein the duct defines a primary fluid flow path between high and low pressure turbines; a suction port disposed upstream of the high pressure turbine on the outer-body surface of the duct; at least two injection openings disposed along the outer body surface of the duct downstream of the high pressure turbine; and a channel in fluid communication with the port and the at least two openings, wherein the channel defines a bypass fluid flow path between the port and the at least two openings.

In another embodiment, the inter-turbine assembly comprises a duct having an upstream portion fluidly coupled to a high pressure turbine and a downstream portion fluidly coupled to a low pressure turbine, wherein the duct comprises an inner body surface and an outer body surface, and wherein the duct defines a primary fluid flow path between high and low pressure turbines; multiple suction ports disposed in the outer-body surface upstream of the high pressure turbine; multiple injection openings laterally disposed along the outer body surface; and multiple channels, each one of the multiple channels having an upstream end and a downstream end, wherein the upstream ends of the multiple channels are fluidly coupled to selected ones of the multiple suction ports and multiple injection openings to form multiple bypass fluid flow paths between the multiple suction ports and the multiple injection openings.

A method for inhibiting boundary separation within an inter-turbine duct assembly for a turbine engine comprises injecting fluid at or prior to a boundary separation point through at least two openings laterally disposed along an outer body surface of a duct.

The above described and other features are exemplified by the following detailed description and figures.

BRIEF DESCRIPTION OF THE DRAWINGS

Referring to the exemplary drawings wherein like elements are numbered alike in the several Figures.

DETAILED DESCRIPTION

An inter-turbine duct assembly for use with turbine engines and methods for optimizing flow within the turbine engine generally includes a multiple slot control scheme for inhibiting boundary separation within the duct assembly. As will be described in greater detail, the multiple slot flow control scheme reduces the total flow control momentum (energy) and mass flow required to keep the main flow boundary layer from separating in aggressive inter turbine ducts and more generally in diffusers. Secondary air is blown through several slot openings displayed along the stream-wise direction rather than one large slot far upstream as in the prior art. As such, the multiple slots require a lower total injection momentum to prevent the boundary layer from separating than a single slot because each downstream slot requires less blowing momentum to maintain attached boundary layers along a given length since the primary flow momentum reduces as the flow diffuses along the duct, thereby providing more aggressive inter-turbine configurations as well as increasing operating efficiencies.

In the descriptions that follow, the term "axial" refers broadly to a direction parallel to the axis about which the rotating components of the gas turbine engine rotate. This axis runs from the front of the engine to the back of the engine. The term "radial" refers broadly to a direction that is perpendicular to the axis of rotation of the rotating components of the gas turbine engine and that points towards or away from the axis of the engine. A "circumferential" direction at a given point is a direction that is normal to the local radial direction and normal to the axial direction as well.

An "upstream" direction refers to the direction from which the local flow is coming, while a "downstream" direction refers to the direction in which the local flow is traveling. In the most general sense, flow through the engine tends to be from front to back, so the "upstream direction" will generally refer to a forward direction, while a "downstream direction" will refer to a rearward direction.

Figure 1:
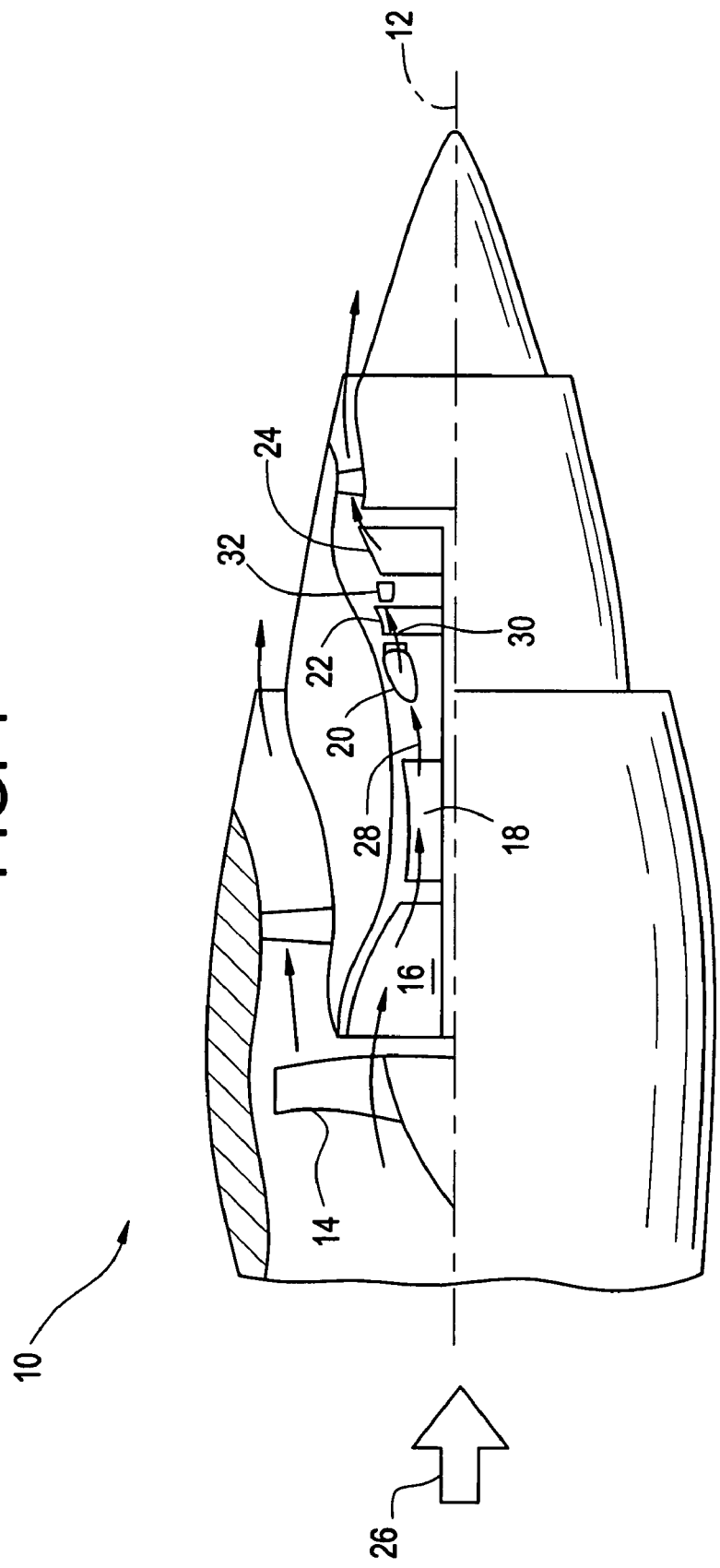
FIG. 1 is a partial sectional view of an exemplary gas turbine engine including a inter-turbine transition duct assembly in accordance with the present disclosure.

FIG. 1 illustrates an exemplary gas turbine engine 10 having a longitudinal or axial centerline axis 12. Although reference is to the exemplary gas turbine, it is contemplated that the inter-turbine duct assembly including the multiple slot control scheme can be adapted for use with other types of turbine engines including, but not limited to steam turbines, turboshaft turbines, water turbines, and the like. The gas turbine engine 10 generally includes in serial flow communication a fan 14, a booster compressor 16, a high-pressure compressor 18, a combustor 20, a high-pressure turbine (HPT) 22, and a low-pressure turbine (LPT) 24. During operation, ambient air 26 first enters the fan 14 and is compressed in turn through the compressors 16 and 18 for providing compressed air 28 to the combustor 20, wherein it is then mixed with fuel and ignited for generating hot combustion gases 30. As the fuel/air mixture is burned in the combustor 20, its temperature is increased and the flow exits the rear of the combustor at a high temperature. The combusted primary flow then passes into the inter-turbine transition duct assembly 32 that interconnects the turbine stages of the engine.

Such turbine engines may be used to provide thrust via the expulsion of the exhaust gases, to provide mechanical power by rotating a shaft connected to one of the turbines, or to provide a combination of thrust and mechanical power. For instance, the compressor on the upstream side of the engine is generally powered by a shaft or shafts driven by one or more of the turbine stages of the engine.

Figure 2:
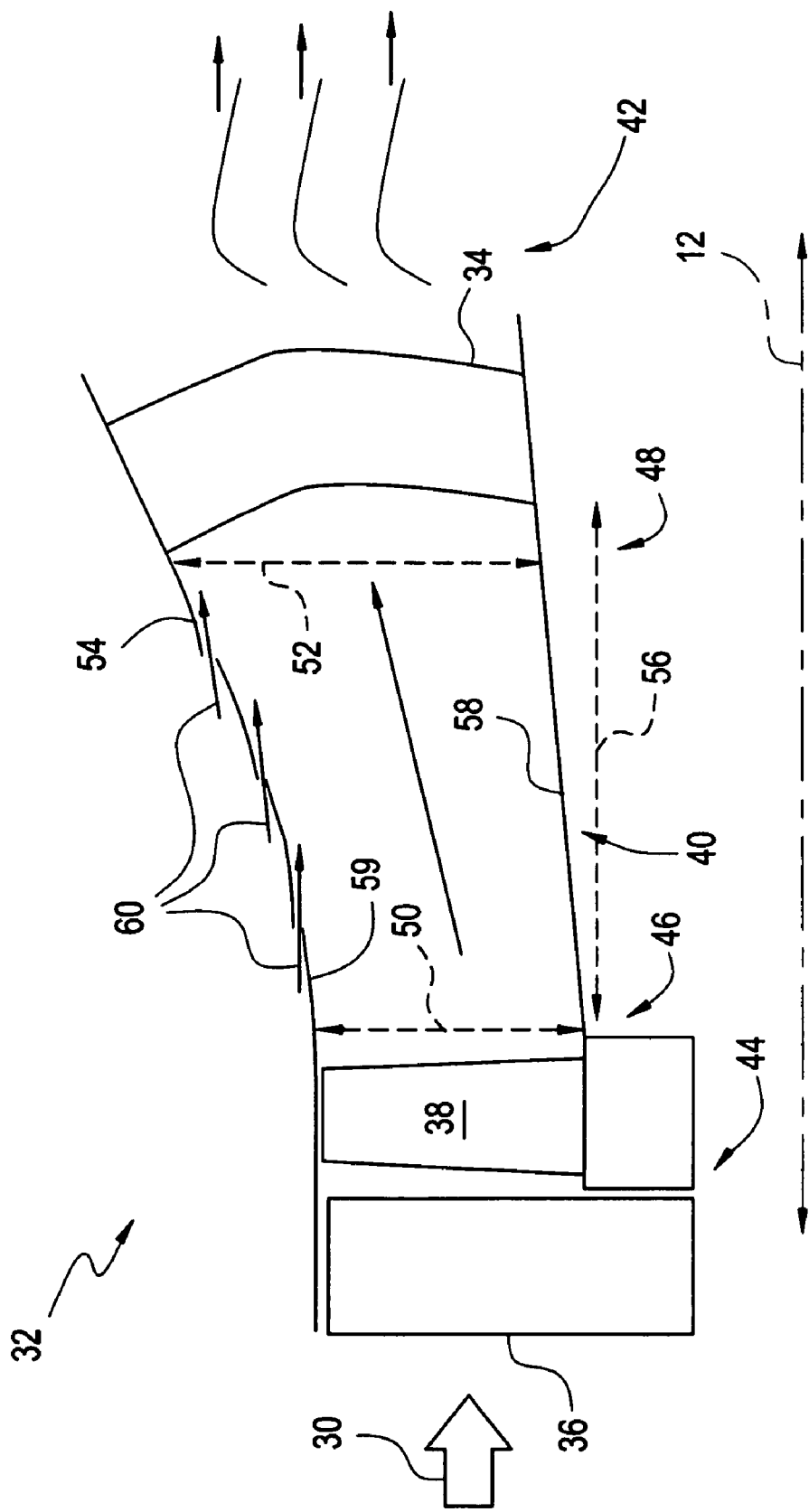
FIG. 2 is a cross sectional view of the inter-turbine transition duct.

FIG. 2 illustrates in greater detail the inter-turbine transition duct assembly 32. The inter-turbine duct assembly 32 includes the low-pressure turbine 24, which includes a nozzle 34 and a low-pressure turbine rotor (not shown), separated from a high-pressure turbine 22, which includes a nozzle 36 and a high-pressure turbine rotor 38, by an inter-turbine duct 40 that operates as an annular diffuser between the turbines 22, 24. Together, the low-pressure turbine nozzle 34 and the low-pressure turbine rotor form a low-pressure turbine spool 42 and the high-pressure turbine nozzle 36 and the high-pressure turbine rotor 38 form a high-pressure turbine spool 44. The high-pressure turbine spool 44 is disposed at the upstream end 46 of the inter-turbine duct 40 and the low-pressure turbine spool 42 is disposed at the downstream end 48 of the inter-turbine duct 40. Collectively, the high-pressure turbine spool 44, the inter-turbine duct 40, and the low-pressure turbine spool 42 are operable for receiving and extracting energy from a primary fluid flow of combustion gases 30 through the gas turbine engine, typically originating from a combustion chamber of the gas turbine engine. This energy can be used to power a vehicle (such as an airplane, a helicopter, a tank, or the like), a power-generation facility or assembly, the gas turbine engine itself, and the like.

As described above, there is a preferred ratio between the height 50 of the high-pressure turbine spool 44 (including the high- pressure turbine nozzle 36 and the high-pressure turbine rotor 38) and the height 52 of the low-pressure turbine spool 42 (including the low-pressure turbine nozzle 34 and the low- pressure turbine rotor) in the gas turbine engine, with the low-pressure turbine spool 42 having a relatively larger diameter than the high-pressure turbine spool 44. Other factors being equal, this ratio provides optimal gas turbine engine performance. However, in order to achieve this ratio, the slope of the outer-body surface 54 of the inter-turbine duct 40 joining the high-pressure turbine spool 44 and the low-pressure turbine spool 42 must be relatively steep. Alternatively, the length 56 of the outer-body surface 54 (and the associated inner body surface 58) of the inter-turbine duct 40 may be relatively long.

It is known to those of ordinary skill in the art that if the slope of the outer-body surface 54 of the inter-turbine duct 40 is relatively steep, strong adverse pressure gradients result along the outer-body surface 54 and boundary layer separation may occur in the inter-turbine duct 40. As a result, gas turbine engine performance may suffer. Moreover, if the length 56 of the outer-body surface 54 of the inter-turbine duct 40 is relatively long, extra weight is added to the gas turbine engine and, again, performance may suffer.

Applicants have found that employing multiple slots 60 circumferentially about the outer body surface 54 in a staggered relationship provides injection of high-energy air into the boundary layer of the flow through the inter-turbine transition duct 40 in a gas turbine engine to forestall the onset of boundary layer separation along the outer-body surface of the duct 40. By energizing the boundary layer flowing over the outer-body surface of the duct 40, a more aggressively diverging duct 40 can be used, allowing for the design of more compact, and also more efficient, turbines for engines. The high-energy air to be injected into the transition duct 40 is bled from the flow along the outer-body wall upstream of the high-pressure turbine and channeled to an injection nozzle. Optionally, the high-energy air can be channeled from any location near the downstream end of the compressor. Because the pressure is greater upstream of the high-pressure turbine than at the point of injection downstream of the high-pressure turbine, the natural pressure difference between the upstream suction port and the downstream injection nozzle will cause the flow to move through the injection channel without requiring a pump to push the fluid through the channel. In this way, the high-energy air injection is self-aspirating.

Figure 3:
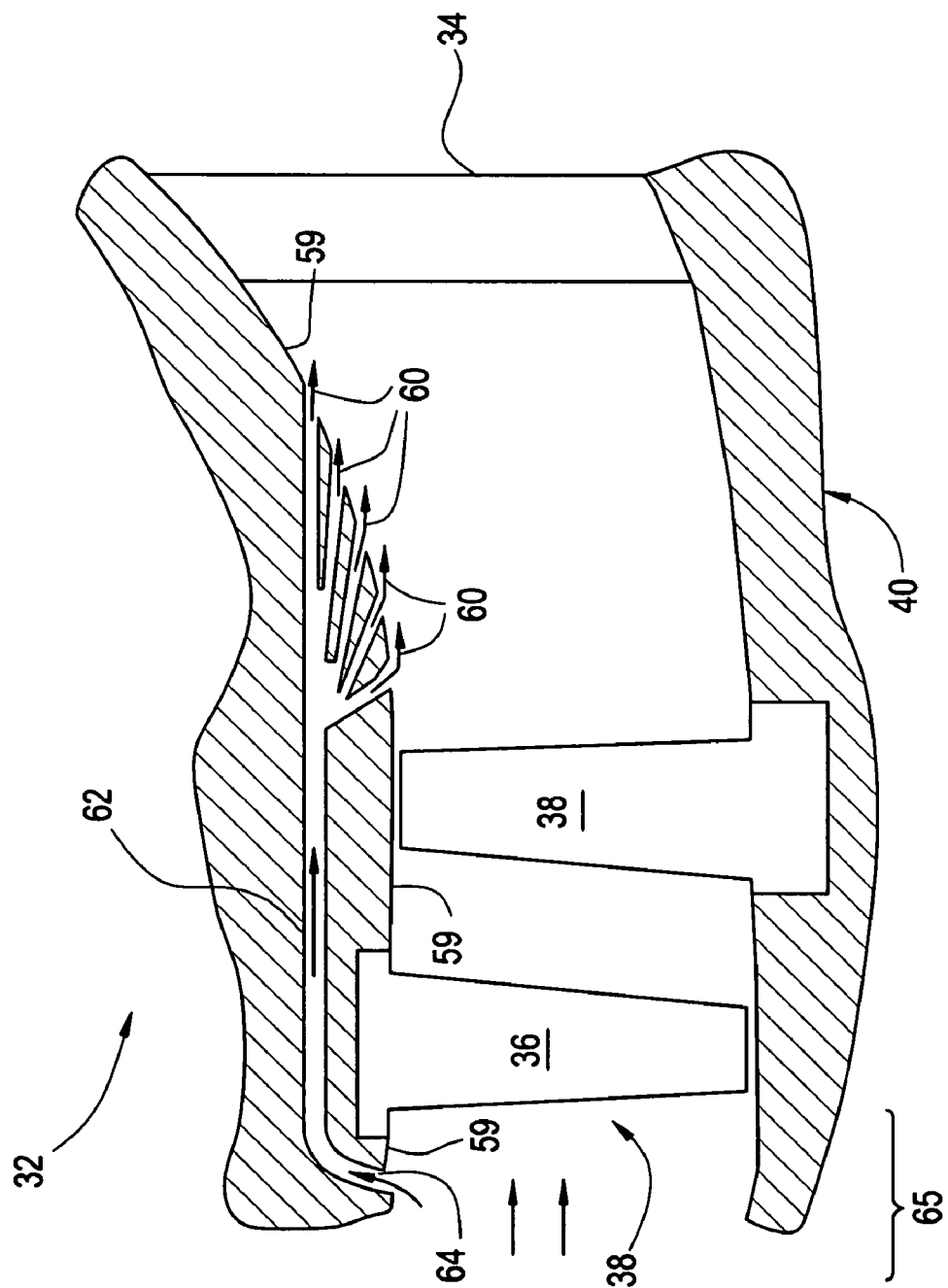
FIG. 3 is a cross sectional view of bypass duct of the inter-turbine transition duct in accordance with one embodiment.

FIG. 3 illustrates one embodiment of the inter-turbine transition duct assembly 32, wherein each one of the multiple slots 60 are fluidly connected to a single channel 62 that includes a suction port 64 located upstream of the high pressure turbine 38 for fluid communication with high energy fluid flow generated by the compressor. As shown, the suction port 64 is shown upstream from the HPT stator 36 and rotor 38. Although the suction port 64 is illustrated as directly upstream from the HPT turbine 22, it is contemplated that in the preferred mode the suction port could be in fluid communication farther upstream such as within the compressor region (not shown) as may be desired for different applications. The efficiency of the flow control scheme is improved (the overall required momentum of the injected flow is decreased) because of the lower required Mach number of injection at progressively downstream axial stations to maintain a Mach number ratio with the diffusing mainstream flow sufficient to prevent separation. In order for the injection to be effective in preventing flow separation, the minimum Mach number ratio required between the control stream and the main stream is about 1.0. Once this ratio is attained, the boundary layer flow will remain attached to the wall for a prescribed distance downstream from the location of injection. This distance generally depends on the momentum flowing through the slot. By using multiple slots along the outer body surface 59, boundary layer flow separation can be effectively prevented along the length of the outer body surface 59.

The number of slot openings 60 is not intended to be limited to a particular number and will depend on numerous factors including, but not limited to the size of the openings, the angle of the opening, the length of the duct, and the like. For example, a small slot requires less momentum to achieve a Mach number ratio of 1.0 but prevents separation only along a relatively short distance downstream of the location of injection. However, since the main flow is diffusing, the main flow Mach number is decreasing downstream, thus allowing the downstream injection slots 60 to achieve the proper Mach ratio using less injected momentum than required for the slot farther upstream.

Figure 4:
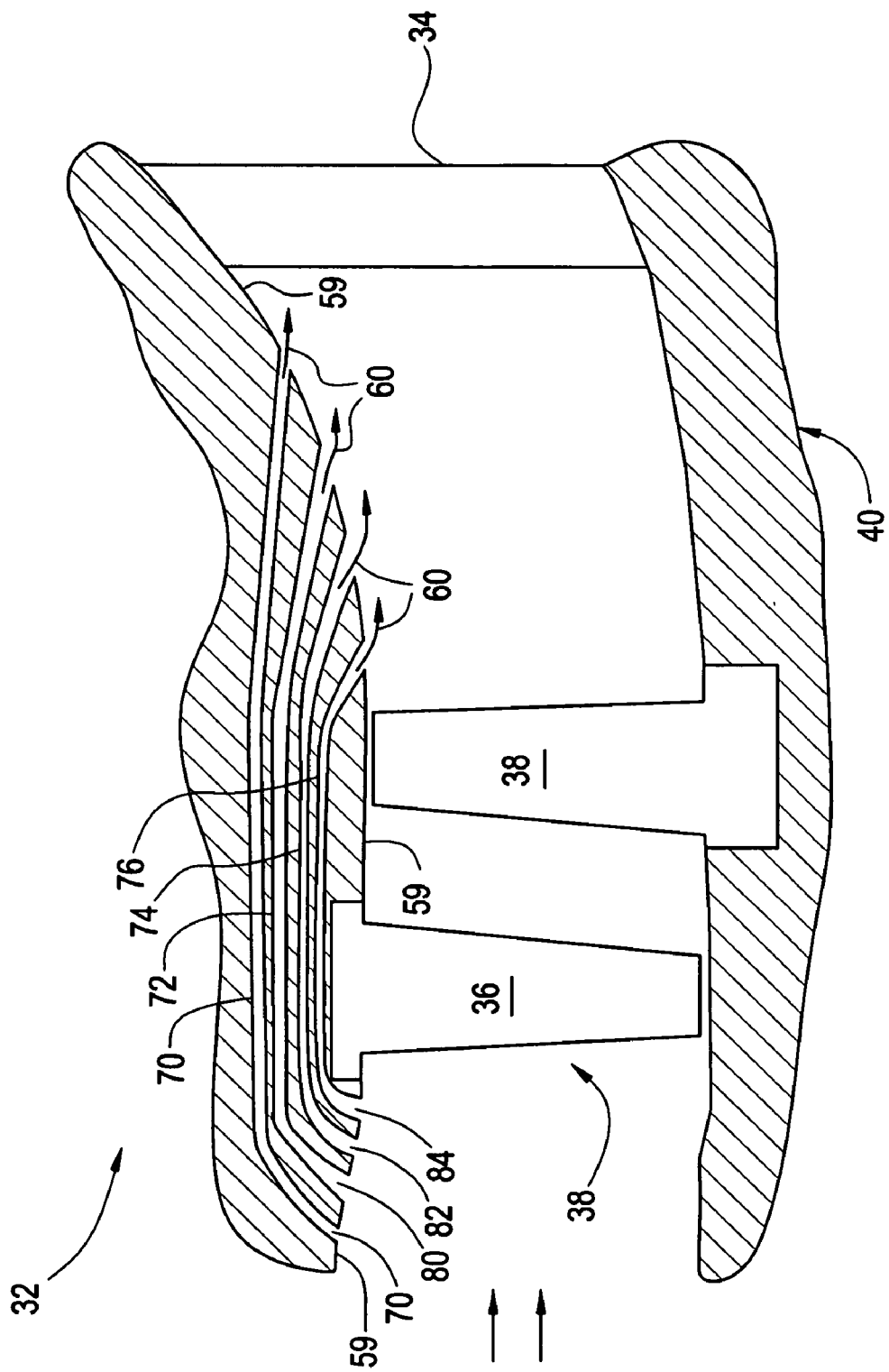
FIG. 4 is a cross sectional view of bypass duct of the inter-turbine transition duct in accordance with another embodiment.

In FIG. 4, the inter-turbine transition duct assembly 32 includes independent channels 70, 72, 74, 76 fluidly connected to each one of a respective multiple slot opening 60. The channels 70, 72, 74, 76 are fluidly connected to independent suction ports 78, 80, 82, 84 at a location upstream from HPT turbine as previously described. Although the suction ports 78, 80, 82, 84 are illustrated as directly upstream from the HPT turbine, it is contemplated that in the preferred mode the suction port could be in fluid communication farther upstream such as within the compressor region (not shown) as may be desired for different applications. Further, each suction port could be arrayed to access regions of different static pressure, e.g., behind different compressor stages, in order to minimize engine cycle penalties. In this manner, the injection can be tuned to remove the boundary separation efficiently along the length of the duct 56.

In the illustrated embodiments, the primary flow from combustion passes through the transition duct assembly 32 before reaching the first nozzle of a low-pressure turbine 34. The natural static pressure difference between the suction ports (e.g., 64) and slots (e.g., 60) results in self-aspiration of flow through the channel (e.g., 62). In effect, the pressure drop across the high-pressure turbine drives the injection slot flow in a self-aspirated mode. Thus, a portion of the flow adjacent to the outer-body surface 59 is drawn into the channel 62 (or channels 70, 72, 74, 76 in FIG. 4) and expelled out of the injection slot(s) 60. This fluid flow injection into the boundary layer of the flow in the inter-turbine transition duct 32 helps in preventing boundary layer separation and allows for the manufacture and use of a transition duct 32 that has a relatively steep slope to its outer-body surface 59 when compared with existing designs. This, in turn, allows a relatively axially short transition duct 32 to be used and an optimal area-ratio to be achieved. This also allows designers to minimize weight and optimize engine performance in a way not previously possible when separation is the limiting factor governing design of the transition duct 32. For example, one system using such a bypass channel may have a transition duct 32 with a length greater than about twice the high-pressure turbine rotor height and a slope of about 40 degrees or higher.

For convenience, FIG. 3 will now be used to describe operation of duct assembly 32. It should be noted that the embodiment provided in FIG. 4 would function in a similar manner. The suction port 64 (also referred to as the extraction port) is used to draw a portion of the primary flow through the turbine engine into the channel 62 and bypass the high-pressure turbine 22 as a result of the natural static pressure difference between the suction port and slots. In this manner, the bypass flow is extracted along the outer-body surface 59 upstream of the high-pressure turbine stator 64.

The suction port 64 is desirably configured to draw mainly from the cooler compressor flow or combustor cooling flow (compressor discharge), rather than drawing from the hot core exhaust flow from the combustor. The temperature of the core exhaust flow is likely to exceed the material limitations of the materials from which the channel 62 is constructed. Although it is possible to use active cooling techniques to protect the materials of the channel from such temperatures, these techniques add complexity and cost to an engine design, and can be avoided by drawing the typically cooler air near the surface instead.

The suction port 64 allows a portion of the flow along the outer-body surface 59 to be drawn into the channel 62 by the existing pressure difference across the high-pressure turbine. In one embodiment, a suitable design for the suction port 64 is a slot in the outer-body surface 59. In various embodiments, the suction port 64 may comprise a plurality of slots, each extending around a portion of the circumference of the forward region can be used (see FIG. 4). In another embodiment, a single continuous annular slot can be used. In other embodiments, the slots can be disposed at more than one axial position along the forward region. In yet another embodiment, the slots can also be formed in other shapes than annular segments, such as holes, 'V'-shapes, recessed scoops (such as NACA ducts), and such other shapes as are known in the art.

In another embodiment, a portion of the outer-body surface 59 of the forward passage 65 can be constructed using a porous material that allows flow to bleed through the porous material and into the channel 62. As with the slots described above, such porous regions may be shaped as one or more annular segments, completely or partially circumscribing an axial portion of the forward passage 65. In other embodiments, other shapes for the porous material, such as holes, 'V'-shapes, NACA duct shapes, or such other designs as are known in the art can be used in place of annular segments.

In another embodiment, the suction port 64 can include one or more scoops or scoop-like shapes that extend into the forward passage 65 to physically turn a portion of the axial flow in the forward passage 65 into a radial flow into the channel 62. Such scoops may be used in addition to, or in place of slots or regions of porous material along the outer-body surface 59 of the forward passage 65. When used in place of slots or porous material, such scoops are disposed at the end of the first port 64 such that the scoop forms the entrance to the slot. In addition to allowing the flow to simply blow into the channel 62 under its own pressure, a scoop also allows part of the dynamic pressure of the flow to be captured and used to motivate the flow through the channel 62.

The flow along the length of the channel 62 is motivated by the difference in pressure between the upstream end of the first portion 64 of the channel 62 and the multiple slots 60. Because there is a pressure drop across the high-pressure turbine 38, the pressure in the duct assembly 32 is greater upstream of the high-pressure turbine than downstream. With the ends of the channel 62 disposed on opposite sides of the high-pressure turbine 38, this natural pressure difference allows the channel 62 to be self-aspirating, i.e., the flow through the channel 62 does not require any motivation other than the existing pressure difference across the duct assembly 32.

At least two injection slots 60 (also referred to herein as injection nozzles or ports or openings, none of which are intended to limit the shape thereof) are used to inject the bypass flow back into the primary flow in the transition duct 40. In order to most effectively energize the boundary layer flow along the outer-body surface 59 of the transition duct 40, the bypass flow is injected along the surface of the transition duct at a high speed. In one embodiment, this speed of the injected flow is supersonic.

The multiple slots 60 can be disposed and aligned in a variety of ways in order to most effectively energize the boundary layer flow along the outer-body surface 59 of the transition duct 40. Some examples of the parameters that characterize the injection nozzles are the yaw angle (the angle in the circumferential direction) and the pitch angle (the angle in the radial direction) at which the nozzle is disposed relative to the tangent plane to the outer-body surface, the size of the nozzle opening, and the shape and configuration of the nozzle or nozzles.

In one embodiment, an annular segment can be used as the geometry for each one of or selected ones of the multiple slots 60. Such annular segments can be formed as a single continuous exit, or as a number of discrete slots around the circumference of the transition duct 40. In other embodiments, separate discrete holes of varying sizes and shapes can be used for the openings at the end of the multiple slots 60. For example, the openings can be circular, oval, or other shapes as are known in the art. Further, the discrete holes can be connected to a device upstream which imparts unsteady pulsing of the blowing flow. The device can be a mechanical or a passive fluidic oscillator as generally described in U.S. patent application Ser. No. 11/201,914 entitled Method and System for Flow Control with Fluidic Oscillators filed on Aug. 10, 2005 and incorporated herein by reference in its entirety.

In one embodiment, the stream-wise direction of the injected flow could be collinear or parallel to the outer-body surface 59. Such an arrangement can be effective when using a step slot injection that exploits the Coanda effect. By using a surface that flows smoothly from the end of the opening 60 to the outer-body surface 59 on the downstream side of the opening, the flow will tend to have a pressure distribution with a minimum at the outer-body surface 59. This helps the injected jet to remain attached to the outer-body surface 50 and flow parallel to this surface and enter the overall flow through the transition duct 40 with a flow that is collinearly to the primary flow through the duct 40. It is also possible to arrange openings 60 such that they inject the flow at a small diverging pitch angle relative to the local outer-body surface 59. Such an angle is less than 30 degrees in one embodiment. This arrangement may be especially effective when the nozzle exits are machined along a smooth contour of the outer-body surface.

The shape of the slot openings 60 can be configured as may be desired to provide injection of the high-energy air. For example, an annular shaped slot can be employed. The slot openings 60 can also be formed in other shapes than annular segments, such as holes, 'V'-shapes, recessed scoops (such as NACA ducts), and such other shapes as are known in the art. Still further, the slot openings 60 can be formed from a porous material that allows flow to bleed through the porous material.

As mentioned above, it is the pressure difference across the high-pressure turbine that drives the flow through the channel 62. The pressure upstream of the high-pressure turbine can typically be about 4 times the pressure downstream of the high-pressure turbine. The pressure drop is usually sufficient to provide for supersonic flow at the exit of the opening 60, even taking into account losses due to the piping and geometry of the suction port 64, the channel 32, and the injection openings 60. In order to fully take advantage of the momentum and energy of the flow through the channel 62, a converging-diverging design for the openings 60 can be used in one embodiment to provide fully expanded supersonic flow with minimal shock wave losses.

The cross-sectional area of each one of the openings 60 can be varied along its length to control the speed of the flow through the nozzle. A converging-diverging design is one in which the cross-section area of the nozzle is reduced along its length to a minimum size at a throat in the nozzle and then increased again downstream of the throat. In another embodiment, purely converging openings 60 are used to inject the flow through the channel 62 back into the primary flow through the transition duct 40. For large pressure differences across the high-pressure turbine, using converging-diverging injection openings minimizes losses due to shock waves and conserves more flow momentum as compared to a simple converging opening in which the flow would choke at the exit.

The use of a converging-diverging supersonic opening in an under-expanded configuration can have a gain of up to 40% in injected momentum compared to the correspondingly choked converging-only nozzle. Such an under-expanded configuration also allows the opening to be stable in response to slight variations in the pressure across the channel 62. Moreover, it allows greater spacing between adjacent openings 60.

In alternate embodiments, various techniques can be used to help minimize the pressure fluctuations across the length of the channel 62 and stabilize the flow through the injection opening. For example, in one embodiment, a plenum can be included along the length of the channel 62 to provide a volume that can act as a buffer to smooth the pressure variations that may propagate along the channel during the operation of the gas turbine engine. In other embodiments, an array of fluidic oscillators can be used. Suitable arrays of fluidic oscillators are disclosed in U.S. patent application Ser. No. 11/201,914 as noted above.

By injecting high speed flow along the outer-body surface 59 of the transition duct 32, the boundary layer flow through the transition duct is energized and becomes better able to negotiate the steep outer wall turn and follow the outer-body surface 59 of the transition duct 32 without separating. Moreover, one of ordinary skill in the art can readily determine the boundary separation points and optimize the spacing as well as the configuration of the multiple slot openings through modeling to effectively inhibit separation at all points along the outer body surface 59.

To effectively inhibit separation of the boundary layer along the outer-body surface 59, it is desirable to energize the boundary layer flow prior to the point of expected separation. Therefore, in one embodiment, multiple openings 60 are disposed upstream of the point where separation is expected to occur in the absence of boundary layer control. In another embodiment, the opening can be located at the point of expected separation. As it will be understood that the exact point of separation may vary with the operating condition of the gas turbine engine, it may be desirable to dispose the injection nozzle openings at points slightly upstream of the most upstream of the expected separation points corresponding to the expected operating conditions of the engine.

By designing the gas turbine engine to include such a self-aspirating duct that injects high-energy air into the outer-wall boundary layer and inhibits separation of the boundary layer in the flow through the turbine duct 32, several advantages may be realized in the operation and design of the engine. One such benefit is a reduction in engine specific fuel consumption because of increased efficiency of the low-pressure turbine 24. Because the outer radius of the low-pressure turbine is greater than for a conventional design, the work extracted by the low-pressure turbine rotors can be more efficiently distributed along the blade span. As a result the overall efficiency of the low-pressure turbine increases.

Another benefit is that relative to conventional designs, for a fixed area ratio and radial displacement, the length of the transition duct 32 is shorter. This avoids the penalties in weight, parasite drag, and support hardware associated with a transition duct 40 of greater length. Such a self-aspirating channel 62 that bypasses the high-pressure turbine 38 is also advantageous over other fluidic schemes to energize the transition duct boundary layer in that the elements are relatively simple and are all disposed in the same area (i.e., near the high-pressure turbine) yielding a compact, low complexity technique for improving the efficiency of the engine.

The relatively compact nature of the flow control scheme and its related extraction and injection openings also make possible retrofitting of such a bypass to existing engines and engine designs with a minimum of additional complexity. In general, the techniques described above can be applied either during the design of a new engine to take advantage of the shorter length of the inter-turbine transition duct 32 and optimized area-ratio made possible by the boundary layer control, or to retrofit an existing engine or engine design in order to improve the efficiency of the engine while changing the design as little as possible. Although it will be appreciated that the most significant benefits of the described systems and techniques may be best realized in new designs, retrofitting of such a compact flow control scheme to provide boundary layer control in the transition duct may be especially beneficial in any duct design that currently suffers from boundary layer separation in the transition duct 40 during particular operating conditions. For such designs, the use of these techniques can provide operating benefits even without modifying the length or angle of the transition duct itself.

In addition to the configuration and embodiments described above, other ways of embodying the techniques and methods described herein may be used. For example, in one variation a plurality of channels may be disposed concentrically about the transition duct 40, the plurality of channels 62 using a common suction port 64 or, alternatively, a plurality of separate, discrete suction ports, or alternatively, a plurality of separate, discrete nozzles. Optionally, the self-aspirating high-area-ratio transition duct assembly may also include a manifold or plenum (not shown) operable for distributing suction force to each of the plurality of suction ports 64, in the event that a plurality of suction ports is used.

In another alternative embodiment, the self-aspirating high-area-ratio transition duct may include an annular channel instead of the discrete channel 62 described above. The annular channel includes a first disc portion extending radially-outward from the forward passage 65. The first disc portion of the annular channel can be coupled to an annular suction port or a plurality of ports 64, such as a slot, a scoop, or a porous plate, disposed within the upstream end of the outer-body surface 59 of the forward passage 65. Optionally, the annular suction port may include a porous filter-like element disposed within and about a portion of the outer-body surface 59 of the forward passage 65. The annular channel also includes a second cylindrical portion aligned substantially parallel to and in a concentric relationship with the outer-body surface 59 of the duct 40. The annular channel further includes a third disc portion extending radially-inward toward and into the transition duct 32. At least two of more openings 60 are coupled to the third disc portion of the annular channel.

Another variation includes an embodiment where a plurality of extraction ports 64 is connected to a plurality of injection nozzles 60 through a single cylindrical connecting channel 62. In another embodiment, a plenum could be disposed along the length of the channel 62, allowing one plenum to mitigate pressure fluctuations across all of the extraction and injection ports and stabilize the flow through the injection ports 60 into the boundary layer flow along the outer body surface 59.

In another embodiment a valve system, or another active or passive system, can be disposed within the channel to control the availability of the bypass flow within the channel 62 or the volume of the flow through the channel 62. In such an embodiment, the channel 62, in combination with the openings 60, could be used to provide boundary layer control when desired and switched off to eliminate any losses from the flow when the engine was operating under circumstances where such boundary layer blowing was not desired or necessary. In a further embodiment, a valve that controlled the mass flow through the channel 62 could be used to optimize the operation of the boundary layer blowing to extract only the required amount of flow to sufficiently control separation in the transition duct. In this way, the minimum amount of mass flow is lost from the primary flow through the high-pressure turbine during operation of the engine.

In a further embodiment, the described principles may be used to practice a method for optimizing the performance of a gas turbine engine by optimizing the ratio between the diameter of the high-pressure turbine spool and the diameter of the associated low-pressure turbine spool and/or optimizing the length of the gas turbine engine. This includes diverting a portion of the primary fluid flow through the inter-turbine duct assembly 32 of the gas turbine engine into a channel 62. Preferably, this bypass fluid flow is taken from the flow along the outer wall of the forward passage 65. The bypass fluid flow is injected into the transition duct 32 to points upstream of where boundary layer separation is anticipated to occur. The injected flow is expelled into the transition duct 32 through multiple annularly arranged openings 60. In one embodiment, this may be a converging-diverging nozzle as described above.

It will also be appreciated by those of skill in the art that the described design is not limited to aircraft engines, but rather any turbine engine in which it is desired to optimize the area-ratio and diameter ratio of the turbine transition duct 40 without compromising the compactness of the engine design. Such exemplary embodiments can include without limitation, power plants for ground vehicles such as locomotives or tanks, power-generation systems, or auxiliary power units on aircraft.

The various embodiments of bypass channel for a gas turbine engine duct described above thus provide a way to achieve more optimal area ratios and diameter ratios between the high-pressure and low-pressure turbines without lengthening the transition duct between the turbines to an extent that causes degradation of performance. These techniques and systems also allow a gas turbine engine designer to design a transition duct that achieves a more optimal area ratio and diameter ratio without having to suffer the performance losses associated with separation of the boundary layer flow in the transition duct encountered when using a more axially compact design.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the use of a scoop in conjunction with the suction port described with respect to one embodiment can be adapted for use with the annular channel described with respect to another. Similarly, the various features described, as well as other known equivalents for each feature, can be mixed and matched by one of ordinary skill in this art to construct duct assemblies in accordance with principles of this disclosure.

What is claimed is:

1. An inter-turbine duct assembly for a turbine engine, the duct assembly comprising:

a duct having an upstream portion fluidly coupled to a high pressure turbine and a downstream portion fluidly coupled to a low pressure turbine, wherein the duct comprises an inner body surface and an outer body surface, and wherein the duct defines a primary fluid flow path between high and low pressure turbines;

a suction port disposed upstream of the high pressure turbine on the outer-body surface of the duct;

at least two injection openings disposed along the outer body surface of the duct downstream of the high pressure turbine and upstream of the low pressure turbine; and a channel in fluid communication with the suction port and the at least two injection openings, wherein the channel defines a bypass fluid flow path between the suction port and the at least two injection openings.

2. The duct assembly of claim 1, wherein the suction port is in fluid communication with the primary flow path at a position intermediate a compressor and a high-pressure turbine.

3. The duct assembly as in claim 1, wherein the suction port comprises a scoop portion.

4. The duct assembly as in claim 1, wherein the at least two injection openings are adapted to provide a flow of fluid at or prior to a boundary separation point.

5. The duct assembly as in claim 1, wherein the channel further comprises a plenum.

6. An inter-turbine duct assembly, for a turbine engine, the duct assembly comprising:

a duct having an upstream portion fluidly coupled to a high pressure turbine and a downstream portion fluidly coupled to a low pressure turbine, wherein the duct comprises an inner body surface and an outer body surface, and wherein the duct defines a primary fluid flow path between high and low pressure turbines;

a suction port disposed upstream of the high pressure turbine on the outer-body surface of the duct;

at least two injection openings disposed along the outer body surface of the duct downstream of the high pressure turbine; and a channel in fluid communication with the suction port and the at least two injection openings, wherein the channel defines a bypass fluid flow path between the suction port and the at least two injection openings, wherein each one of the at least two injection openings is a slot opening circumferentially disposed about the outer body surface.

7. The duct assembly as in claim 6, wherein each one of the at least two circumferentially disposed injection openings are positioned along the outer body surface of the duct at or prior to a boundary separation point.

8. The duct assembly as in claim 1, wherein each one of the at least two injection openings has a circular or oval cross sectional shape.

9. An inter-turbine duct assembly, for a turbine engine, the duct assembly comprising:

a duct having an upstream portion fluidly coupled to a high pressure turbine and a downstream portion fluidly coupled to a low pressure turbine, wherein the duct comprises an inner body surface and an outer body surface, and wherein the duct defines a primary fluid flow path between high and low pressure turbines;

a suction port disposed upstream of the high pressure turbine on the outer-body surface of the duct;

at least two injection openings disposed along the outer body surface of the duct downstream of the high pressure turbine; and a channel in fluid communication with the suction port and the at least two injection openings, wherein the channel defines a bypass fluid flow path between the suction port and the at least two injection openings, wherein the channel comprises an annular structure.

10. An inter-turbine duct assembly, for a turbine engine, the duct assembly comprising:

a duct having an upstream portion fluidly coupled to a high pressure turbine and a downstream portion fluidly coupled to a low pressure turbine, wherein the duct comprises an inner body surface and an outer body surface, and wherein the duct defines a primary fluid flow path between high and low pressure turbines;

a suction port disposed upstream of the high pressure turbine on the outer-body surface of the duct;

at least two injection openings disposed along the outer body surface of the duct downstream of the high pressure turbine; and a channel in fluid communication with the suction port and the at least two injection openings, wherein the channel defines a bypass fluid flow path between the suction port and the at least two injection openings, wherein each one of the at least two injection openings comprises an annular slot about the outer-body surface.

11. The An inter-turbine duct assembly, for a turbine engine, the duct assembly comprising:

a duct having an upstream portion fluidly coupled to a high pressure turbine and a downstream portion fluidly coupled to a low pressure turbine, wherein the duct comprises an inner body surface and an outer body surface, and wherein the duct defines a primary fluid flow path between high and low pressure turbines;

a suction port disposed upstream of the high pressure turbine on the outer-body surface of the duct:

at least two injection openings disposed along the outer body surface of the duct downstream of the high pressure turbine; and a channel in fluid communication with the suction port and the at least two injection openings, wherein the channel defines a bypass fluid flow path between the suction port and the at least two injection openings, wherein each one of the at least two injection openings comprises an annular slot partially circumscribed about the outer-body surface.

12. The duct assembly of claim 1, wherein the channel further comprises an array of fluid oscillators.

13. The duct assembly of claim 1, wherein each one of the at least two openings are disposed at different axial positions along the length of the duct at and/or prior to a boundary separation point that would exist in the absence of the one opening.

14. A turbine engine including the duct assembly of claim 1.

* * * * *

UNITED STATES PATENT AND TRADEMARK OFFICE
CERTIFICATE OF CORRECTION

PATENT NO. : 7,549,282 B2  
APPLICATION NO. : 11/258547  
DATED : June 23, 2009  
INVENTOR(S) : Wiedenhoefer et al.

Page 1 of 1

It is certified that error appears in the above-identified patent and that said Letters Patent is hereby corrected as shown below:

On the Title Pg. in (75) Inventors: delete "Widenhoefer" and insert -- Wiedenhoefer --, therefor.

In Column 12, Line 31, in Claim 11, delete "The An" and insert -- An --, therefor.

In Column 12, Line 40, in Claim 11, delete "duct:" and insert -- duct; --, therefor.

Signed and Sealed this

Fifteenth Day of September, 2009

David J. Kappos
*Director of the United States Patent and Trademark Office*